United States Patent [19]

Sato et al.

[11] Patent Number: 5,164,256
[45] Date of Patent: Nov. 17, 1992

[54] POROUS SLIDE BEARING AND METHOD FOR MANUFACTURING THE SAME

[75] Inventors: Tasuku Sato, Toincho; Kiyoshi Nakanishi, Iwata; Yoshinori Ito, Kuwana, all of Japan

[73] Assignee: NTN Corporation, Japan

[21] Appl. No.: 602,224

[22] PCT Filed: Feb. 23, 1990

[86] PCT No.: PCT/JP90/00226
§ 371 Date: Oct. 26, 1990
§ 102(e) Date: Oct. 26, 1990

[87] PCT Pub. No.: WO90/10160
PCT Pub. Date: Sep. 7, 1990

[30] Foreign Application Priority Data

Feb. 27, 1989 [JP] Japan .................. 1-22540
Aug. 28, 1989 [JP] Japan .................. 1-222660

[51] Int. Cl.$^5$ ............................. B32B 3/26
[52] U.S. Cl. .......................... 428/304.4; 427/294;
428/306.6; 428/308.4; 428/317.9; 428/320.2;
428/322.7; 428/422
[58] Field of Search ........... 428/320.2, 322.7, 422,
428/304.4, 306.6, 308.4, 317.9; 427/294

[56] References Cited

U.S. PATENT DOCUMENTS

| 2,951,721 | 9/1960 | Asp | 428/322.7 |
| 4,079,170 | 3/1978 | Cluff | 428/320.2 |

FOREIGN PATENT DOCUMENTS

| 244412 | 4/1963 | Australia | 428/422 |
| 52-44871 | 4/1977 | Japan | 428/422 |
| 54-10582 | 5/1979 | Japan | 428/422 |
| 55-105865 | 8/1980 | Japan | 428/422 |

Primary Examiner—William J. Van Balen
Attorney, Agent, or Firm—Nikaido, Marmelstein, Murray & Oram

[57] ABSTRACT

A porous slide bearing (1) made of a porous sintered compact (5) is impregnated with an oil or a lubricant (6) containing a thickening agent at a concentration of less than 3 percent by weight and in the outer surface area thereof with a lubricant (7) containing a thickening agent at a concentration of 3 percent by weight or more. Such a bearing can prevent leakage of lubricant owing to fluctuations in temperature.

A method for producing a porous slide bearing includes the steps of homogenizing a lubricant to make the crystals contained therein into fine particles and to disperse them uniformly, and impregnating under vacuum said lubricant into pores in a porous slide bearing. This method makes it possible to improve the penetration of grease into the bearing, to lower its apparent viscosity and to improve the impregnating efficiency.

2 Claims, 2 Drawing Sheets

POROUS SLIDE BEARING AND METHOD FOR MANUFACTURING THE SAME

TECHNICAL FIELD

This invention relates to a porous slide bearing made of a porous sintered compact impregnated with a lubricant and a method for manufacturing the same.

BACKGROUND ART

Porous slide bearings are mainly used in motors for household electric appliances, automotive motors and the like. A bearing of this type is made of a sintered compact having pores impregnated with a lubricating oil which oozes out onto the sliding surface during use, thus extending the bearing's working life.

A porous slide bearing is normally made of a sintered compact having a homogeneous porous structure obtained by subjecting the compact to such treatments as mixing, press molding, calcining or forming finely powdered grains of iron, copper, zinc, tin, graphite, nickel or an alloy thereof. Such a sintered compact usually has pores 50 microns or less in diameter (many of them are 10 microns or less).

In order to permit use of such a porous slide bearing for a prolonged period, its pores have to be impregnated with a sufficient amount of lubricating oil. However, since it is kept inside the pores of the sintered compact only by the action of surface tension and viscosity, a decrease in viscosity might happen together with an increase in volume due to frictional heat in the bearing or in a high-temperature environment, causing the lubricating oil to flow out of the bearing. Thus, the range of operating temperatures is restricted and the durability of the bearing can drop.

In order to solve these problems, with a bearing which is required to have a long life, it is necessary to provide an oil tank made of felt or wick and keep it in contact with the outer surface of the bearing.

But if such means is employed in applications where any oil stain is undesirable, it is necessary to provide a seal to prevent oil leakage. This will restrict the freedom of the design and increase the cost.

It is an object of this invention to provide an oil-containing bearing which can prevent the leakage of lubricant by use of simple means without using an oil tank.

SUMMARY OF THE INVENTION

In order to achieve the abovesaid object, the present invention consists of a porous slide bearing made of a porous sintered compact impregnated with a lubricating oil, characterized in that the sintered compact is impregnated with a first lubricant in the form of an oil or a grease containing a thickening agent at a concentration of less than 3 per cent by weight and with a second lubricant in the form of a grease containing a thickening agent at a concentration of 3 per cent by weight or more, the outer surface of the sintered compact being impregnated to a predetermined thickness with the second lubricant.

The lubricant held in the sintered compact flows onto the sliding surface, contributing to lubrication. The hard lubricant which has a comparatively high concentration of thickening agent serves to close the open ends of the pores, thus preventing the soft lubricant inside from leaking.

The present invention also encompasses in a method for producing a porous slide bearing including the steps of homogenizing a lubricant to make crystals contained therein into fine particles and to disperse them uniformly, and impregnating under vacuum the lubricant into pores in the porous slide bearing.

DETAILED DESCRIPTION OF THE PREFERRED EMBODIMENT

Figure 1:
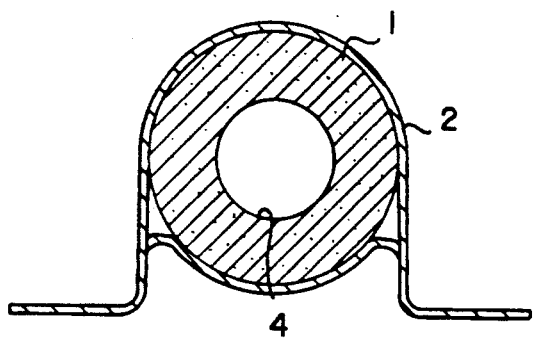
FIG. 1 is a vertical sectional front view of the pillow block in use.
Figure 2:
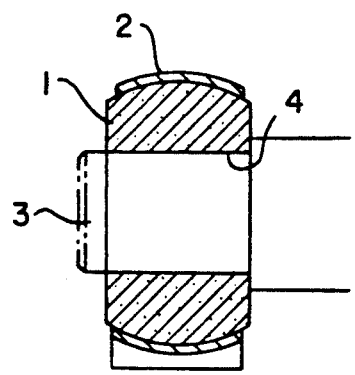
FIG. 2 is a vertical sectional side view of the same.
Figure 3:
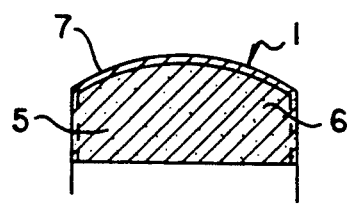
FIG. 3 is an enlarged sectional view of the oil-containing bearing.

FIGS. 1 and 2 show a pillow block having a porous slide bearing 1 supported by a steel housing 2. The bearing 1 has a bore 4 through which a shaft 3 is rotatably mounted. The inner peripheral surface of the bore 4 serves as a sliding surface.

The bearing 1 is made of a conventional porous sintered compact 5. The inside of its pores is impregnated with a soft lubricant 6 which is an oil or a grease containing a thickening agent having a concentration of less than 3 per cent, whereas their outer surface is impregnated to a predetermined thickness with a lubricant 7 which is a grease containing a thickening agent with a concentration of 3 per cent by weight or more. The hard grease 7 hardens to close the open ends of the pores and thus prevent leakage of the soft grease 6.

If the hard grease 7 at the outer surface has too high a viscosity, it would be difficult for it to penetrate into the pores. Thus it will bulge from the outer surface of the sintered compact 5. This is not desirable from the viewpoint of handling of the product. Thus the concentration of the thickening agent should not be more than about 50 per cent and preferably be about 25 per cent.

As the thickening agent for the soft grease 6 or the hard grease 7, a soap such as lithium, sodium, magnesium, barium or aluminum soap may be used. The thickening agent is dispersed in the base oil and transforms itself into a micellar structure, thus serving to keep the oil in a semisolid state.

Figure 4:
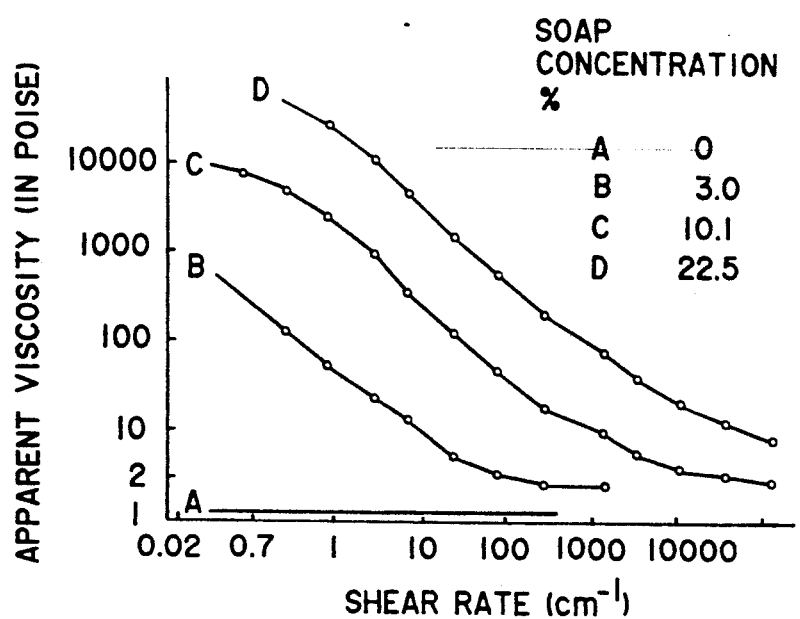
FIG. 4 is a graph showing the relation between the shear rate and the apparent viscosity of grease.

As is apparent from FIG. 4, which shows the relationship between the shear rate and the apparent viscosity of the grease, the viscosity is 1000 poise or more at the outer peripheral surface of the bearing where the shear rate is zero, even if a grease having a concentration of 3 per cent is used, provided the base oil has a viscosity of 1 poise. On the other hand, at the sliding surface where the shear rate is large, the apparent viscosity is sufficiently low.

As is apparent from such relationship, on the sliding surface, even a grease which exhibits the same behavior as an oil behaves like a high-viscosity oil at the outer peripheral surface where no shearing force acts. Therefore, it can effectively prevent leakage of the grease.

Table 1 shows some greases which can be used as the soft grease 6 to be filled deep inside the pores and the hard grease 7 to be filled at the outer surface thereof.

TABLE 1

| | Base oil | Thickening agent |
|---|---|---|
| Soft grease | α-olefin oil | Lithium (1%) |
| | Polyester oil | Lithium (1%) |
| Hard grease | α-olefin oil | Lithium (5%) |
| | Polyester oil | Lithium (5%) |

Next, the production method embodying this invention will be described with reference to FIGS. 5 and 6.

Usually, a semisolid grease is made by mixing a thickening agent into a base oil such as a petroleum lubricating oil or a synthetic lubricating oil (e.g. silicone oil and poly-α-olefin), together with various additives (such as an antioxidant, a detergent-dispersant, an extreme pressure additive, an antifriction agent, an oilness improver, a friction conditioner, a viscosity index improver, a flow-point curing agent, an anticorrosive and an antifoamer), melting it into a liquid grease by heating to a phase transition temperature and cooling it.

Figure 5:
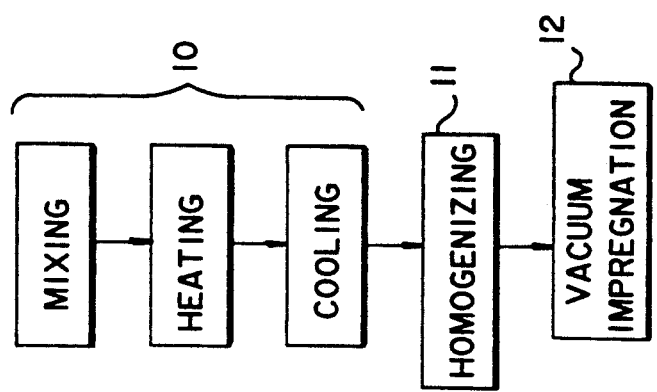
FIG. 5 is a flow chart showing the order of the manufacturing steps according to the present invention.

As shown in FIG. 5, the production method according to this invention includes the grease production (step 10) for producing the semisolid grease, homogenizing (step 11) in which the semisolid grease is made into a viscous liquid state by shearing, and vacuum impregnating (step 12) in which the sintered bearing is impregnated with a liquid grease made by heating the grease in a viscous liquid state.

By subjecting the semisolid grease made in the grease production step 10 and cooled thereafter to a homogenizing treatment by shearing, the crystallized thickening agent is finely grained and dispersed uniformly.

As a result, the semisolid grease turns into a viscous liquid state and its apparent viscosity lowers. This will improve the penetrability of the grease into the pores in the sintered bearing.

Next, the sintered bearing is subjected to vacuum-impregnation with the homogenized viscous grease.

In the vacuum impregnation step 12, as with any conventional method, after placing the sintered bearing in a vacuum vessel, the viscous liquid grease is poured into the vessel kept under vacuum. Then the interior of the vessel is heated to impregnate the sintered bearing with the grease now in a liquid state. After impregnation, the remaining grease is recovered from the vessel, which is now put under the atmospheric pressure. Finally the sintered bearing is taken out.

Since the grease used in the vacuum impregnation step 12 is a viscous liquid grease made by homogenizing a semisolid grease and thus has a low apparent viscosity, the impregnating temperature necessary to turn it into a liquid grease during the vacuum impregnation step can be reduced as low as 70°–100° C., less than half the temperature which has heretofore been necessary.

The production method according to this invention is employed not only to impregnate a sintered bearing with grease but also to impregnate a felt with grease.

Figure 6:
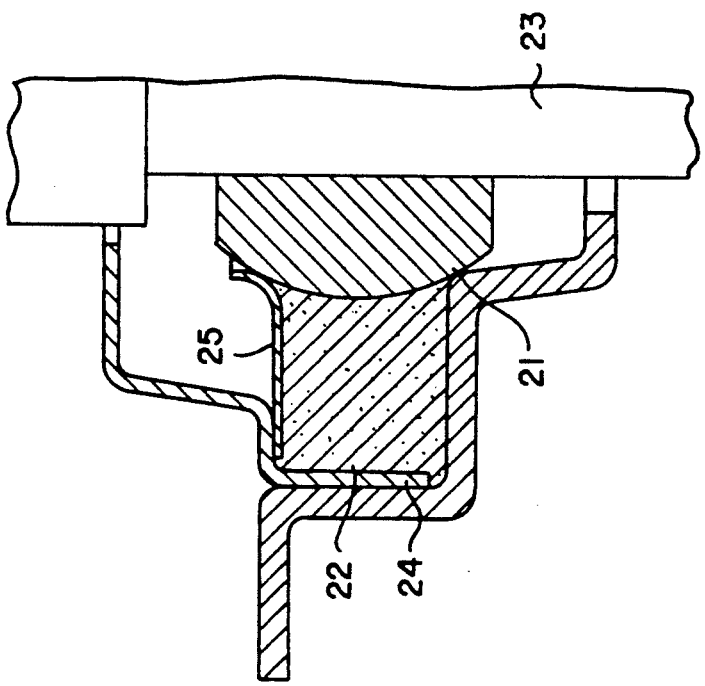
FIG. 6 is a vertical sectional view showing how the porous slide bearing according to this invention is used.

FIG. 6 shows a structure in which a porous slide bearing impregnated with grease is used in combination with a felt 22 impregnated with grease. The slide bearing 21 supporting a rotary shaft 23 has a spherical outer periphery held in position by a unit frame 24 and a spring retainer 25. The felt 22 impregnated with grease is held between the unit frame 24 and the spring retainer 25 so as to be kept in contact with the outer surface of the slide bearing 21.

The felt 22 impregnated with grease has a high grease retention irrespective of fluctuations in temperature. Thus even if the ambient temperature rises, the grease leaks relatively little. The felt can supply grease of unchanged quality to the slide bearing 21 impregnated with grease. The performance of the grease will not be impaired. As a result, the durability of the bearing improves.

By impregnating the felt 22 with grease, the grease retention improves and the grease leakage is prevented. Thus a slide bearing provided with such a felt can be advantageously used as a bearing for a vertical motor.

Since the semisolid grease is homogenized and used for vacuum impregnation of a porous slide bearing, the crystal composed mainly of the thickening agent in the semisolid grease turns by homogenizing into fine particles, which are dispersed uniformly. This improves the penetration of grease into the porous slide bearing and lowers the apparent viscosity. This will in turn make it possible to efficiently impregnate the bearing with grease during the vacuum impregnation step.

Also, the impregnating temperature during the vacuum impregnation step can be reduced to half or less than half the temperature which has heretofore been necessary. This will make it possible to simplify the structure of the heating device and to shorten the impregnating time. Thus the working cost can be reduced.

Further, since the grease impregnating temperature can be reduced, the grease is less liable to oxidize when heated and thus the characteristics of the grease will less deteriorate.

We claim:

1. A porous slide bearing comprising:
a porous sintered compact;
a first lubricant impregnated into said sintered compact in the form of an oil or a grease containing a thickening agent at a concentration of less than 3 per cent by weight; and
a second lubricant impregnated into said sintered compact after said first lubricant in the form of a grease containing a thickening agent at a concentration of at least 3 per cent by weight, an outer surface of said sintered compact being impregnated to a predetermined thickness with said second lubricant.

2. A method for producing a porous slide bearing comprising the steps of:
forming a porous slide bearing;
homogenizing first and second lubricants so as to form crystals contained therein into fine particles and to disperse the crystals uniformly in said first and second lubricants, said first lubricant being in the form of an oil or a grease containing a thickening agent at a concentration of less than 3 per cent by weight and said second lubricant being in the form of an oil or a grease containing a thickening agent at a concentration of at least 3 per cent by weight;
impregnating under vacuum said first lubricant into pores in the porous slide bearing; and
impregnating under vacuum said second lubricant into pores in the porous slide bearing so as to form a predetermined thickness on an outer surface of the porous slide bearing.

* * * * *